(12) United States Patent
Hansen et al.

(10) Patent No.: US 6,277,312 B1
(45) Date of Patent: *Aug. 21, 2001

(54) IN-MOLD DECORATING WITH LASER ETCHING

(75) Inventors: Michael Hansen, West Bend, WI (US); Steven M. Schutt, Hastings, MN (US)

(73) Assignee: Serigraph, Inc., West Bend, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/266,668

(22) Filed: Mar. 11, 1999

(51) Int. Cl.[7] .................................................. C04B 41/00
(52) U.S. Cl. ............................... 264/132; 216/4; 216/28; 216/94; 264/400; 425/383; 427/554
(58) Field of Search ............................. 425/383; 264/400, 264/132; 427/554; 216/94, 28, 4

(56) References Cited

U.S. PATENT DOCUMENTS

| | | |
|---|---|---|
| 1,118,315 | 11/1914 | Trist . |
| 2,510,091 | 6/1950 | Dorfsen et al. . |
| 3,651,191 | 3/1972 | Glatt et al. . |
| 3,663,793 | 5/1972 | Petro et al. . |
| 4,707,396 | 11/1987 | Wank et al. . |
| 4,898,706 | 2/1990 | Yabe et al. . |
| 4,917,927 | 4/1990 | Sakaitani et al. . |
| 4,961,894 | 10/1990 | Yabe et al. . |
| 5,182,065 | 1/1993 | Piotrowski et al. . |
| 5,223,201 | 6/1993 | Masui et al. . |
| 5,264,172 | 11/1993 | Rosica et al. . |
| 5,338,396 | * 8/1994 | Abdala et al. ........................ 156/655 |
| 5,376,314 | 12/1994 | Share et al. . |
| 5,393,474 | 2/1995 | Souders . |
| 5,424,017 | 6/1995 | Hinduja et al. . |
| 5,432,684 | 7/1995 | Fye et al. . |
| 5,456,955 | 10/1995 | Muggli . |
| 5,477,024 | 12/1995 | Share et al. . |
| 5,512,226 | 4/1996 | Rosica et al. . |
| 5,514,317 | 5/1996 | Rosica et al. . |
| 5,516,606 | 5/1996 | Sato et al. . |
| 5,614,338 | 3/1997 | Pyburn et al. . |
| 5,630,979 | 5/1997 | Welz et al. . |
| 5,723,843 | 3/1998 | Muggli . |
| 5,728,994 | 3/1998 | Hutton . |
| 5,766,827 | 6/1998 | Bill et al. . |
| 5,837,937 | * 11/1998 | Reese et al. ........................ 174/66 |
| 6,102,686 | * 8/2000 | Eschenfelder ........................ 425/388 |

OTHER PUBLICATIONS

"Instamark Laser Marking Systems" Control Laser Corporation, Mar. 1998.

"Performance Specifications" Control Laser Corporation, Mar. 1998.

* cited by examiner

*Primary Examiner*—Randy Gulakowski
*Assistant Examiner*—Michael Kornakov
(74) *Attorney, Agent, or Firm*—Andrus, Sceales, Starke & Sawall, LLP

(57) ABSTRACT

An in-mold decorating and laser etching method prints a plurality of layers on a flat thin sheet plastic substrate, including combinations of opaque and colored, including translucent and smoked, forms the substrate into a contoured three dimensional workpiece, injection molds the workpiece to an injection molded part, and laser etches a designated graphic in the opaque layer on the part.

47 Claims, 9 Drawing Sheets

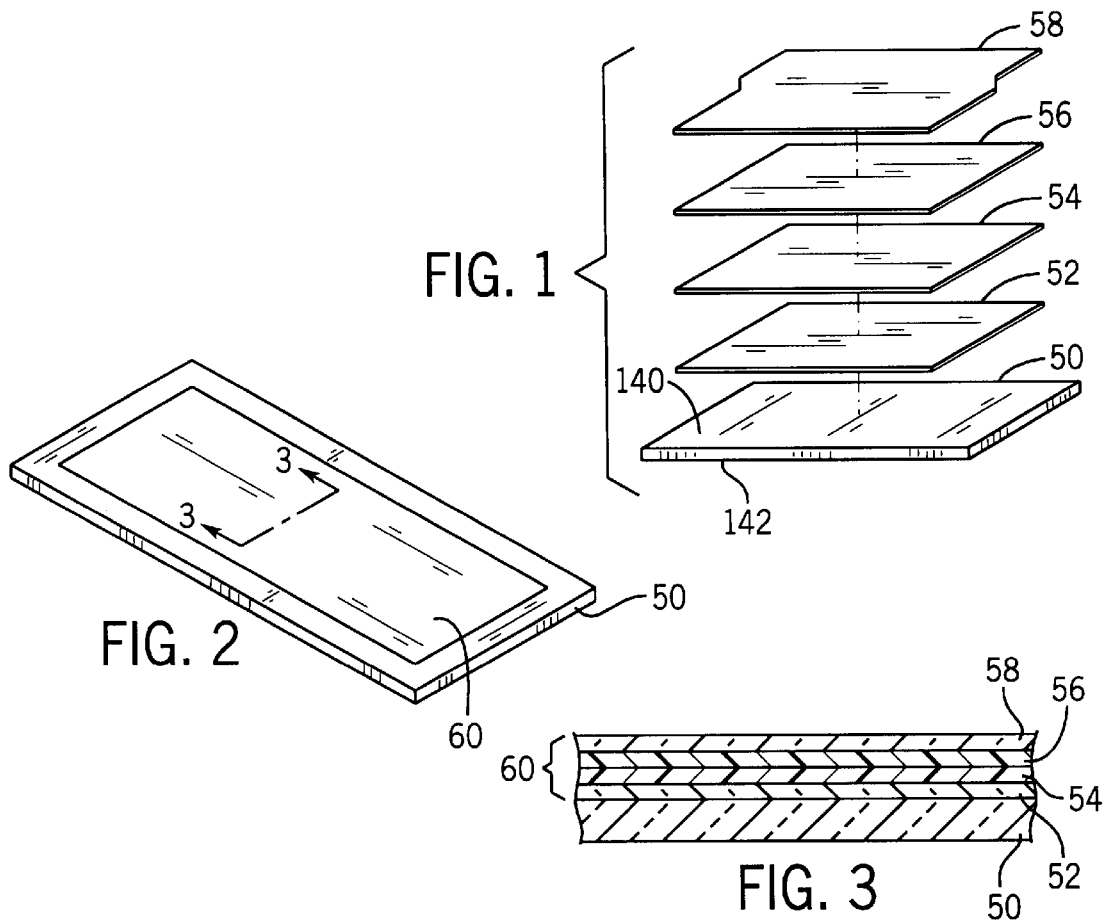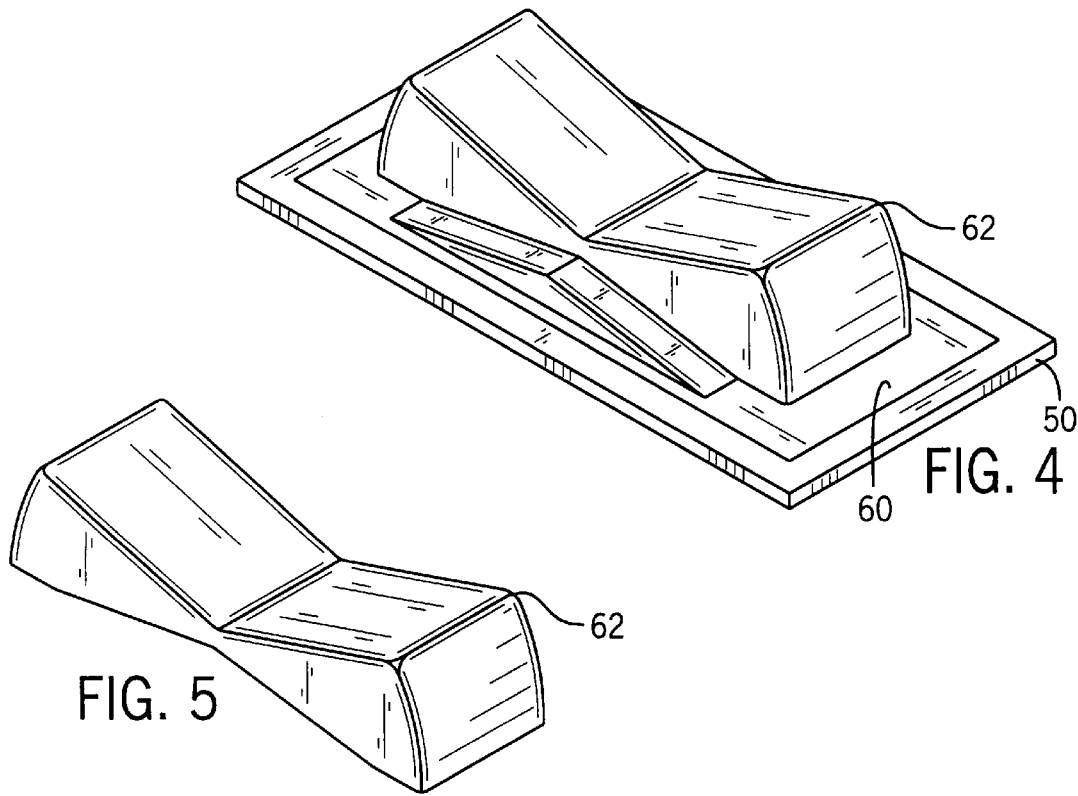

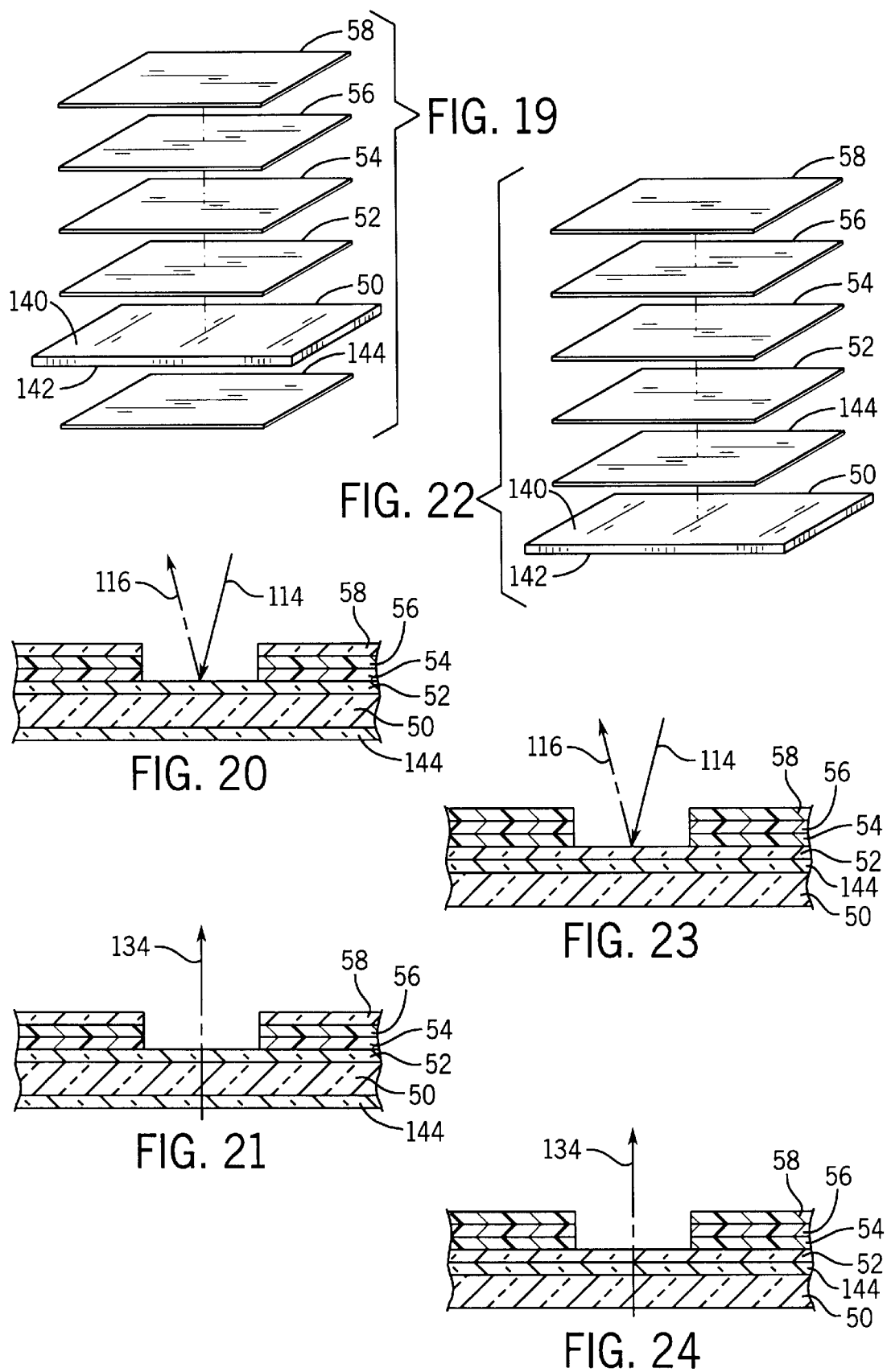

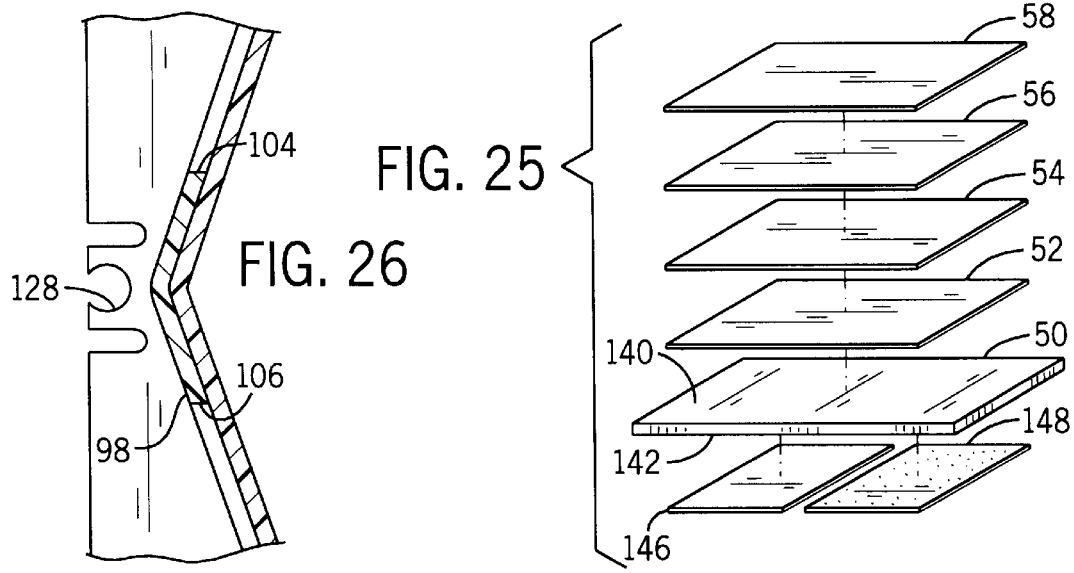
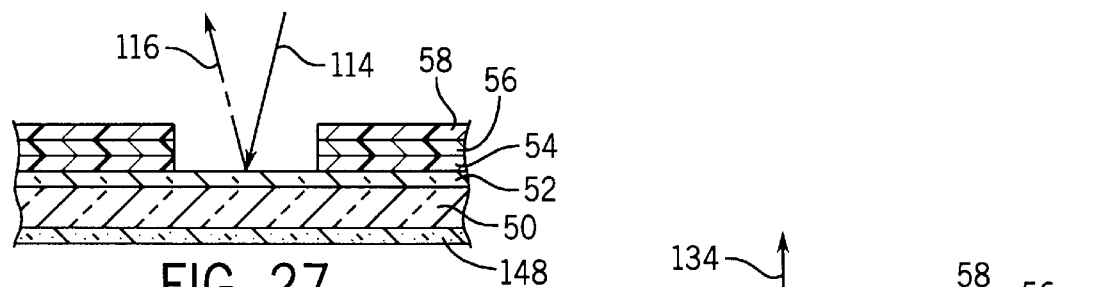
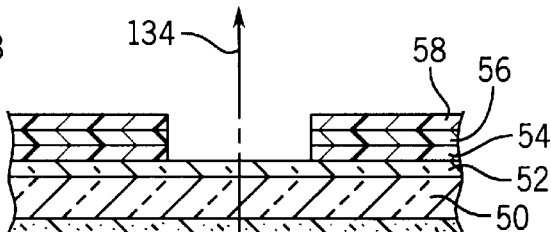
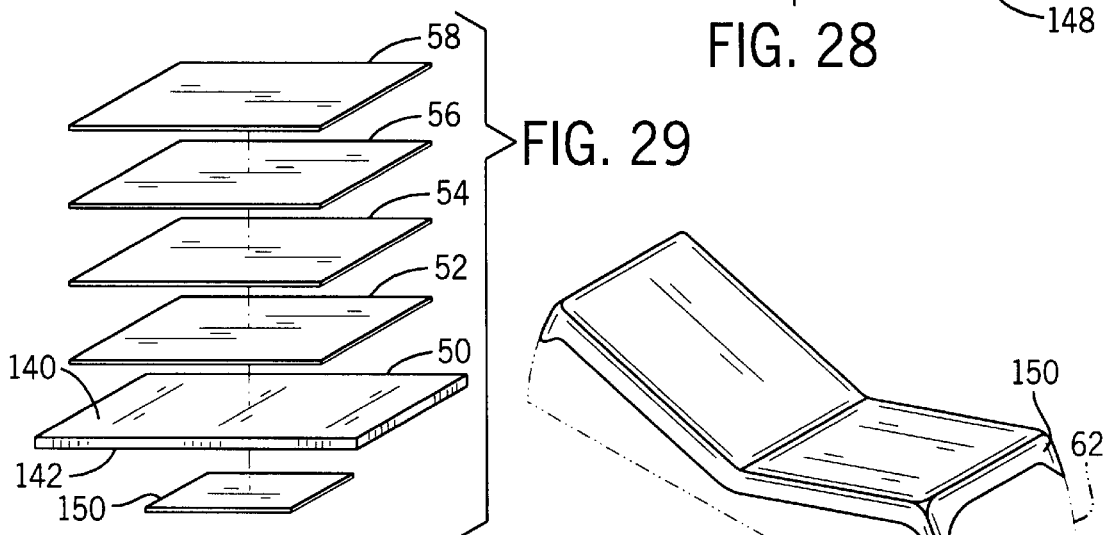
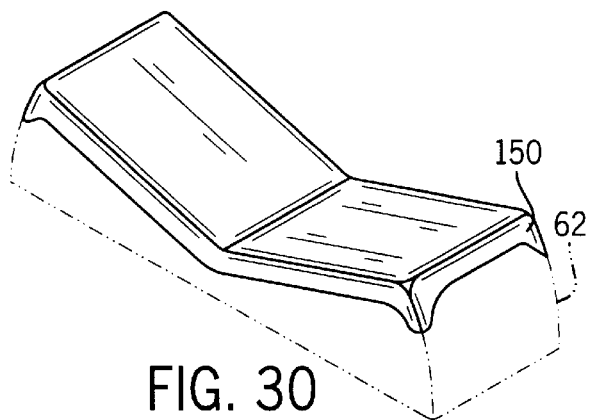

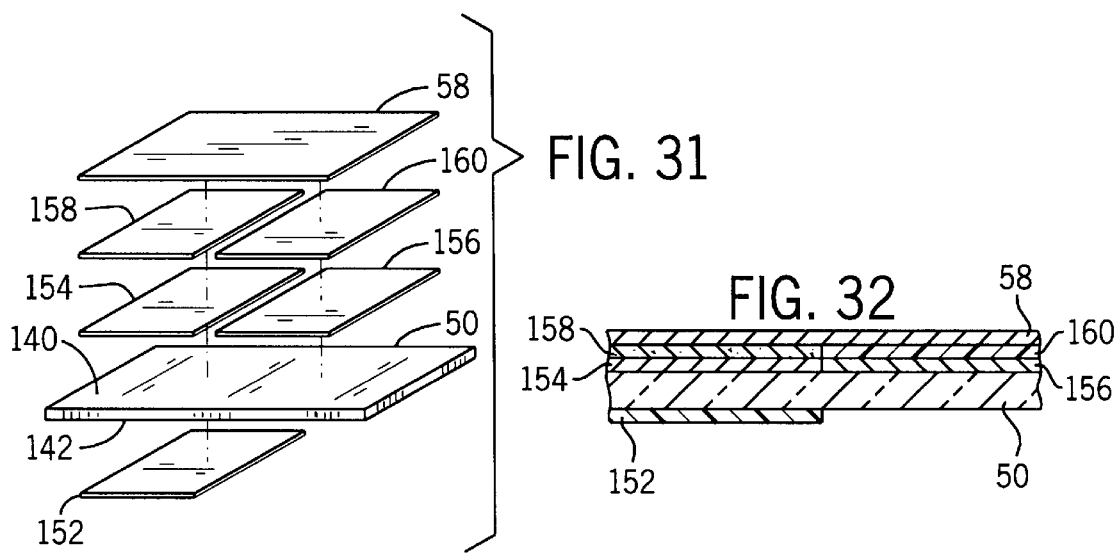
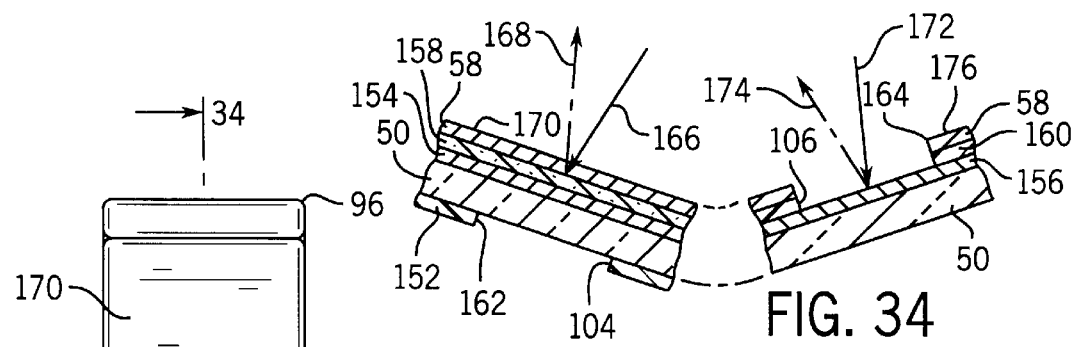
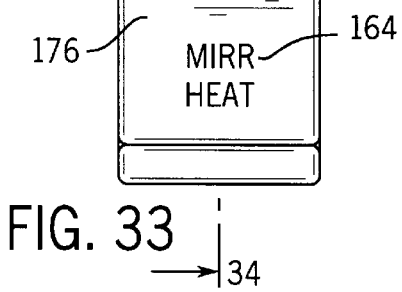
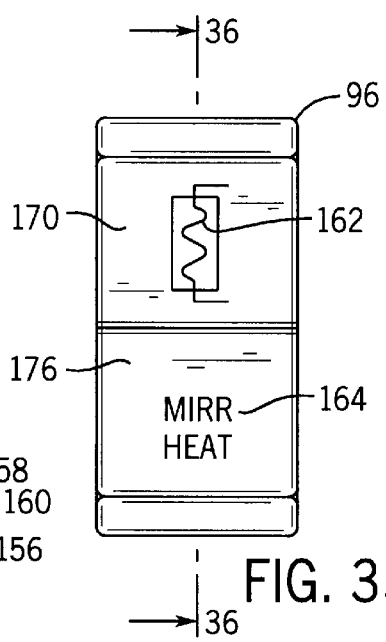
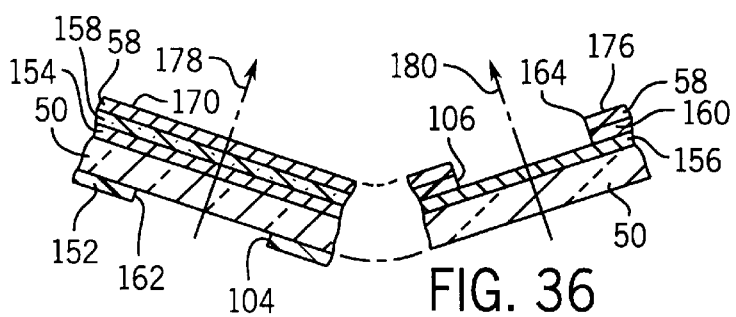

IN-MOLD DECORATING WITH LASER ETCHING

BACKGROUND AND SUMMARY

The invention relates to in-mold decorating, and more particularly to in-mold decorating with laser etching.

In-mold decorating is known in the art. A flat thin plastic substrate, such as polycarbonate, polyester, etc. is provided in extruded sheet form, typically 0.005 to 0.030 inch thick. One or more ink layers are then printed on the substrate, which ink layers may be printed to provide desired graphics. The flat substrate is then formed into a contoured three-dimensional workpiece, which forming may be aided by heat, i.e. thermal-forming, or without heat, i.e. cold forming. The substrate may then be cut into a plurality of subpieces, for example each containing one or two contoured items. The substrate, or each subpiece if so cut, is then placed in an injection mold, followed by closing of the mold, then injection of molten plastic against the workpiece to fuse therewith and form an injection molded part, following by opening of the mold, and removal of the part from the injection mold. Laser etching is also known in the art. The laser is used to ablate designated portions of ink layers to provide a desired graphic.

The present invention provides an in-mold decorating and laser etching method combining the best aspects of in-mold decorating and of laser etching and affording both lower manufacturing cost and higher image quality. In a further desirable aspect, the invention enables numerous applications and functional features, including both daytime and nighttime display of the same graphic on the same item, different color displays for nighttime and daytime of the same graphic on the same item, separate displays for nighttime and daytime on the same item, different color and multicolor dual displays for nighttime and/or daytime on the same item, semi-transparent or blank displays and selective color displays of the same graphic on the same item, and numerous manufacturing sequencing options for cost effectiveness.

BRIEF DESCRIPTION OF THE DRAWINGS

FIG. 1 is an exploded perspective view of a layering sequence for in-mold decorating and laser etching in accordance with the invention.

FIG. 2 is an assembled perspective view of the layered substrate of FIG. 1.

FIG. 3 is a sectional view taken along line 3—3 of FIG. 2.

FIG. 4 is a perspective view showing the substrate of FIG. 3 after forming into a contoured three dimensional workpiece.

FIG. 5 is a perspective view of the workpiece of FIG. 4 after a cutting step.

FIG. 14 illustrates daytime viewing.

FIG. 19 is like FIG. 1 and shows another embodiment.

FIG. 20 is like FIG. 14 and illustrates daytime viewing for the combination of FIG. 19.

FIG. 21 is like FIG. 20 and illustrates nighttime viewing.

FIG. 22 is like FIG. 1 and shows a further embodiment.

FIG. 23 is like FIG. 14 and illustrates daytime viewing for the combination of FIG. 22.

FIG. 24 is like FIG. 23 and illustrates nighttime viewing.

FIG. 25 is like FIG. 1 and shows a further embodiment.

FIG. 26 is like a portion of FIG. 13 and illustrates the formed part for the combination of FIG. 25.

FIG. 27 is like FIG. 14 and illustrates daytime viewing for the combination of FIG. 25.

FIG. 28 is like FIG. 27 and illustrates nighttime viewing.

FIG. 29 is like FIG. 1 and shows a further embodiment.

FIG. 30 is similar to a portion of FIG. 9 and illustrates the formed part for the combination of FIG. 29.

FIG. 31 is like FIG. 1 and shows a further embodiment.

FIG. 32 is like FIG. 3 and shows the substrate layering for the combination of FIG. 31.

FIG. 33 is like FIG. 12 and illustrates a top daytime view of the part formed by the combination of FIG. 31.

FIG. 34 is a sectional view taken along line 34—34 of FIG. 33.

FIG. 35 is like FIG. 33 and illustrates a top nighttime view.

FIG. 36 is a sectional view taken along line 36—36 of FIG. 35.

DETAILED DESCRIPTION OF THE INVENTION

Figure 6:
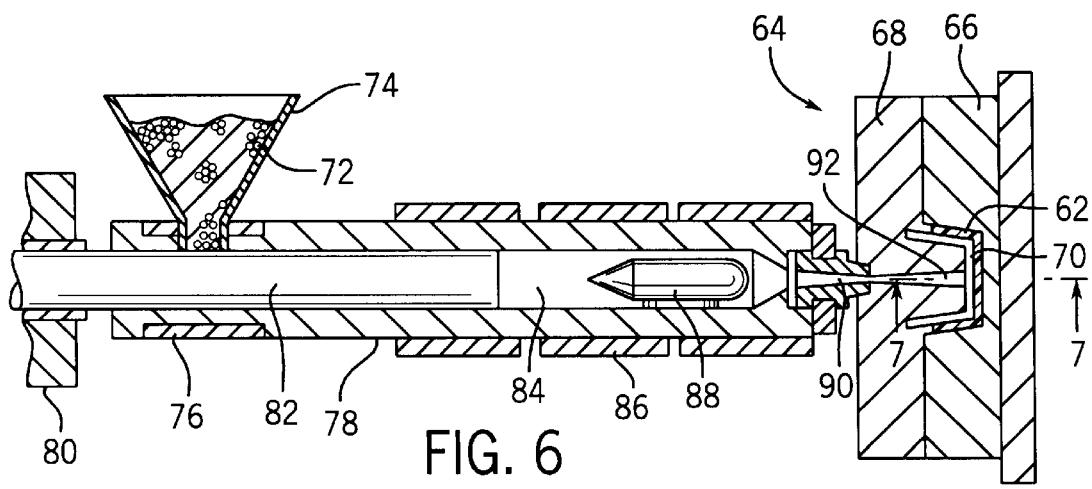
FIG. 6 is a schematic sectional view illustrating injection molding.

FIG. 1 shows a flat thin sheet plastic substrate 50, for example polycarbonate, polyester, etc., extruded in sheet form, and typically 0.005 to 0.030 inch thick. A translucent white layer 52 is printed on substrate 50. Layer 52 is preferably screen printed on substrate 50, though other methods may be used for applying such layer, and other layers, to be described, including offset printing, roll coating, and other methods of applying or coating a layer. Layer 52 is preferably printed with a translucent white catalyzed ink to achieve a high melt temperature and abrasion resistance. Following printing of layer 52, opaque layers 54 and 56 and hard coat layer 58 are printed on the substrate, to provide the layered structure shown in FIGS. 2 and 3. Each of opaque layers 54 and 56 is a black screen printing ink. A single opaque layer may be sufficient, though two layers are preferred, to minimize pinhole leakage, and maximize opacity. Hard coat layer 58 is transparent and preferably has a high abrasion resistance. Layer 52 is printed with laser-vaporization-resistant ink. Layer 54, 56, 58 are printed with laser-vaporization-susceptible inks. In FIGS. 2 and 3, layers 52, 54, 56, 58 are collectively designated by reference character 60.

Layered flat substrate 50, FIG. 2, with layering 60 thereon, is formed into a contoured three dimensional workpiece 62, FIG. 4. The forming is preferably aided by heat in accordance with known thermal-forming techniques, and preferably also aided by vacuum and/or pressure in accordance with known thermo-vacuum forming techniques. Alternatively, the substrate may be cold formed into a contoured three dimensional workpiece. The layered and formed substrate is then cut, e.g. in accordance with known die-cutting techniques, to trim and remove the portion of the substrate which will not be used in the final part, to yield the workpiece 62 shown in FIG. 5. The workpiece is then placed in an injection mold 64, FIG. 6, followed by injecting of molten plastic against the workpiece to fuse therewith and form an injection molded part, followed by removal of the part from the injection mold.

Figure 7:
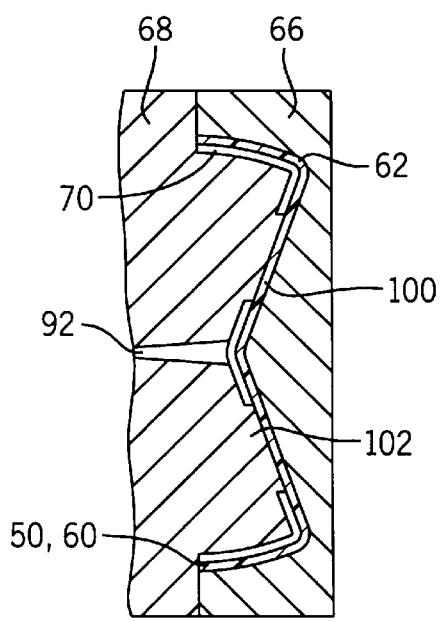
FIG. 7 is a sectional view taken along line 7—7 of FIG. 6.
Figure 8:
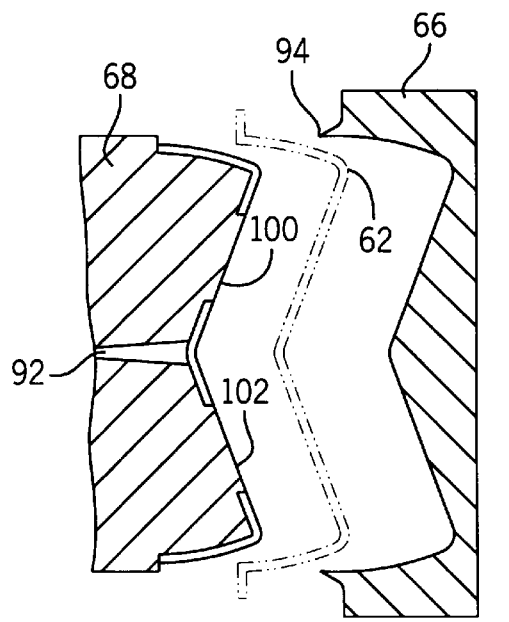
FIG. 8 is a view similar to FIG. 7, and illustrates an alternate embodiment.

Injection molding is known, and will be only briefly described. The mold has a female mold half 66 and a male mold half 68 defining a mold cavity 70 therebetween receiving workpiece 62. The mold is initially open, with mold halves 66 and 68 separated. Workpiece 62 is placed in female mold half 66, whereafter one or both of the mold halves are moved towards each other to close the mold. FIGS. 6 and 7 show the mold in its closed condition. Plastic resin, preferably polycarbonate, pellets 72 are introduced at hopper 74 into cooling zone 76 of heating cylinder or barrel 78. An actuator 80 has an extendable and retractable plunger or ram or piston 82 pushing the pellets into injection chamber 84 in heating zone 86, wherein the pellets are melted to molten plastic and spread by torpedo or spreader 88 and injected through nozzle 90 and sprue or runner 92 into cavity 70, all as is known. The injected molten plastic in cavity 70 fuses with workpiece 62 to form an injection molded part. After cooling, the mold is opened, and the part removed from the mold. FIG. 8 shows an alternate embodiment, wherein one of the mold halves, such as female mold half 66, includes knife edge projections such as 94 cutting the contoured substrate of FIG. 4 during the mold closing step, to eliminate the die-cutting step between FIGS. 4 and 5.

Figure 9:
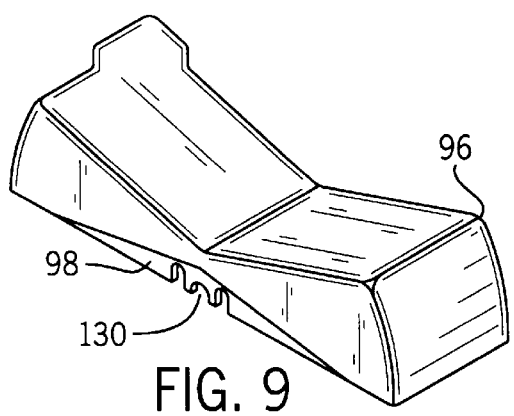
FIG. 9 is a perspective view illustrating the injection molded part after the injection molding of FIGS. 6 and 7.
Figure 10:
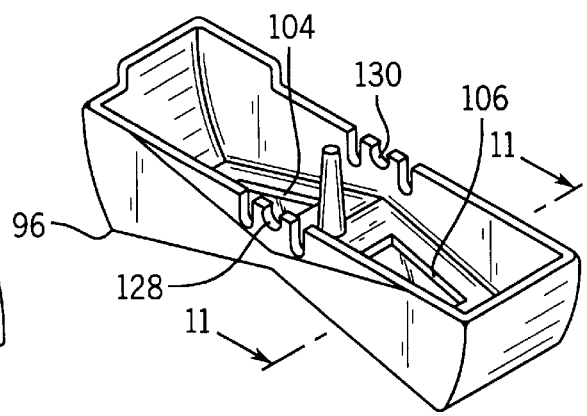
FIG. 10 is a perspective view from below of the part of FIG. 9.
Figure 11:
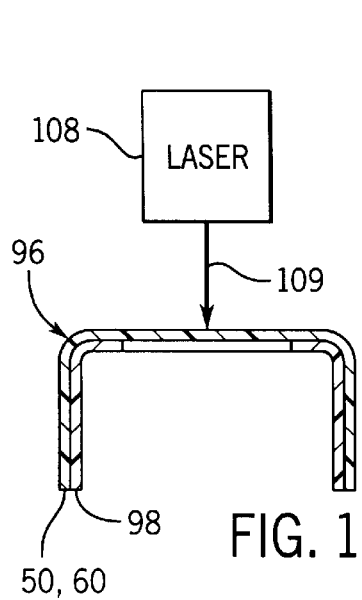
FIG. 11 is a sectional view taken along line 11—11 of FIG. 10, and illustrates laser etching.
Figure 12:
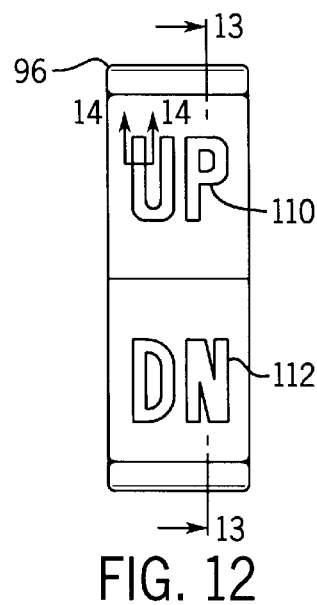
FIG. 12 is a top view of the part of FIG. 11 after laser etching.

FIGS. 9 and 10 show the molded part 96 removed from the mold. The molded part includes substrate 50, printed layers 60, and fused and hardened plastic base 98, FIGS. 11 and 13, which had filled mold cavity 70. In the embodiment shown, male mold half 68 includes blocking surfaces 100, 102, FIG. 7, engaging substrate 50 at respective designated windows, 104, 106, FIGS. 10, 13, in alignment with white translucent layer 52 and blocking impingement of molten plastic against substrate 50 at such respective window. Molded part 96 is then etched with laser 108, FIG. 11, at laser beam 109 to provide a designated graphic in the opaque layers on the part, for example "UP" at 110 and "DN" at 112, FIG. 12. Various types of lasers are commercially available for such etching applications, for example one of which is "Insta Mark Laser Marking Systems", Insignia Icon Stylus, Control Laser Corporation, 7503 Chancellor Drive, Orlando, Fla., USA 32809. As noted above, hard coat layer 58 and opaque layers 56 and 54 are printed with laser-vaporization-susceptible ink, whereby such layers ablate away as etched along the desired graphic by laser 108. White translucent layer 52 is printed with laser-vaporization-resistant ink and hence does not ablate away.

Figure 14:
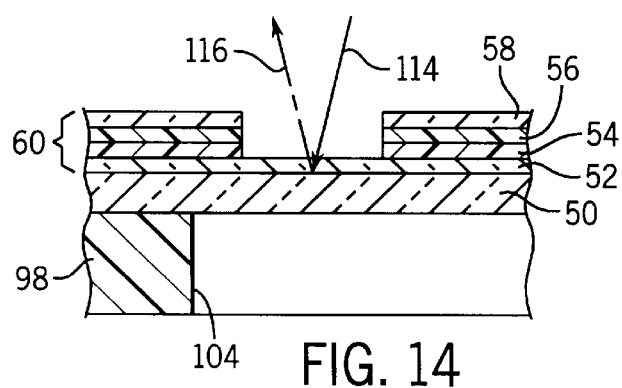
FIG. 14 is an enlarged view taken along line 14—14 of FIG. 12.

FIG. 14 illustrates the daytime visual display of molded part 96. Incoming ambient light at 114 is reflected by layer 52 back towards the user or viewer at 116. Thus, layer 52 provides a daytime color showing the designated graphics "UP" and "DN" as white lettering against the black background of opaque layers 54, 52 through transparent outer hard coat layer 58.

Figure 15:
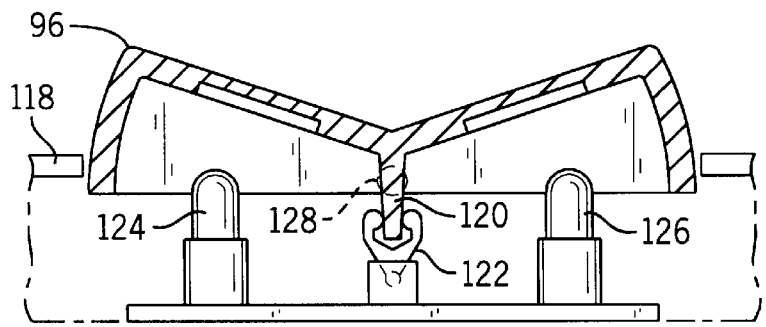
FIG. 15 is a side view partially in section illustrating an application of the part of FIGS. 12 and 13.
Figure 16:
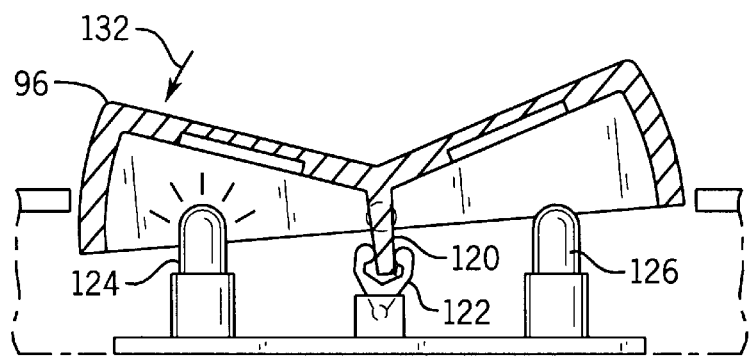
FIG. 16 is like FIG. 15 and shows another mode of operation.
Figure 17:
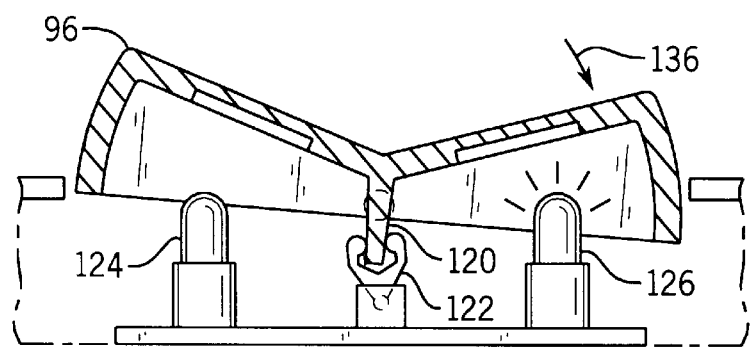
FIG. 17 is like FIG. 15 and shows a further mode of operation.
Figure 18:
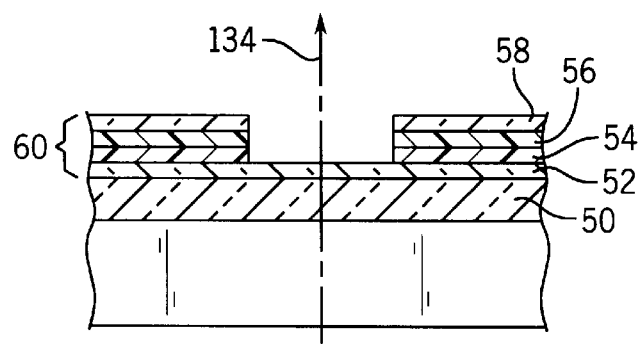
FIG. 18 is like FIG. 14 and illustrates nighttime viewing.

FIG. 18 illustrates the nighttime visual display in conjunction with the application illustrated in FIGS. 15–17. Molded part 96 is in the form of a toggle or paddle button nested in an automotive instrument cluster panel 118, FIG. 15, and having a central molded stem 120 engaging switch 122 for actuating the latter between a first position, FIG. 16, illuminating light bulb 124, and a second position, FIG. 17, illuminating light bulb 126. Part 96 rocks about integrally molded trinions 128, 130. In the central neutral position shown in FIG. 15, neither light bulb 124 nor 126 is illuminated, and daytime viewing is as shown in FIG. 14, with both "UP" and "DN" being visible by reflection of ambient light as white lettering against a black background. In the nighttime operational mode illustrated in FIG. 16, "UP" on leftward rocking of molded part rocker button 96 as shown at arrow 132, light bulb 124 is illuminated, and light therefrom passes through substrate 50 and white translucent layer 52 as shown at arrow 134, FIG. 18, providing an illuminated white "UP" graphic at 110. Likewise, when rocker button molded part 96 is rocked rightwardly as shown at arrow 136 in FIG. 17, light from illuminated bulb 126 shines through substrate 50 and layer 52, providing an illuminated white "DN" graphic at 112. In each of the rocked positions of FIGS. 16 and 17, the light passing through layer 52 at 134 in addition to the reflective ambient light at 116, FIG. 14, provides additional and brighter indication of the condition of the switch, including during daytime. This provides feedback to the user or driver of whether the switch is in its up or down actuated position. For example, during daytime, in the position of FIG. 16, the graphic "UP" at 110 will be brighter than the graphic "DN" at 112, and hence the user will know the switch is in its activated "UP" condition for the controlled function, e.g. power window activated "UP". At nighttime, in the position of FIG. 16, the "UP" graphic at 110 will be visible due to the through-transmitted light at 134, and the "DN" graphic at 112 will not be visible, and hence the noted feedback will be provided to the user.

In another embodiment, both light bulbs 124 and 126 are always illuminated at nighttime, e.g. when the driver turns on his parking lights or headlights. In this embodiment, both the "UP" graphic at 110 and the "DN" graphic at 112 are visible to the driver, including at nighttime due to transmitted light 134. The driver may thus select which function is desired, e.g. window "UP" or window down. Other combinations are possible.

Substrate 50 has first and second oppositely facing surfaces 140 and 142, FIG. 1. First surface 140 faces the user. In backlit applications, e.g. FIGS. 15–18, second surface 142 faces the backlight, 124, 126. These definitions of first and second surfaces are commonly used in the printing art, for example first surface printing, second surface printing, and so on. In the embodiments described thus far, the noted layers are printed on the first surface, and the molten plastic from runner sprue 92 is injected against the second surface. The laser etching step is performed by directing the laser beam 109 at the first surface. In an alternate embodiment, color layer 52 is printed on second surface 142, i.e. on the opposite side of the substrate from the opaque layers 54, 56, to be described.

FIG. 19 shows a further embodiment with first and second color layers 52 and 144 printed on substrate 50. Layer 52 is a translucent daytime color ink, preferably white as noted above. Layer 144 is printed with a nighttime color ink, for example amber, or other colors as desired. In daytime, FIG. 20, the part displays to the user the daytime color at the graphic, as shown by reflected ambient light 114, 116. At nighttime with a backlight, the part displays to the user the nighttime color at the graphic, for example ambient as shown at 134 in FIG. 21. In FIG. 19, color layers 52 and 144 are printed on opposite sides of the substrate.

In an alternate embodiment as shown in FIGS. 22–24, layers 144 and 52 are printed on the same side of the substrate, which may be the first surface as shown, or alternatively may be the second surface. The daytime color at the graphic is white as shown in FIG. 23 at reflected ambient light 114, 116. The nighttime color at the graphic is amber as shown in FIG. 24 at 134 from the backlight.

Figure 13:
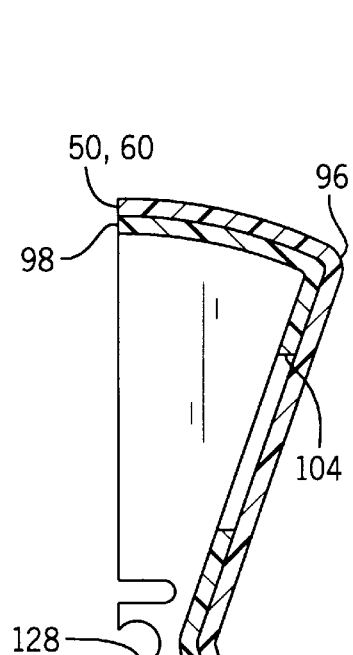
FIG. 13 is a sectional view taken along line 13—13 of FIG. 12.

FIG. 25 shows an embodiment similar to FIG. 19, except that color layer 144 has been replaced with two layers 146 and 148 of different color, one for each window 104 and 106, FIGS. 26 and 13. Each window has a daytime reflective color as illustrated in FIG. 27. Window 104 has a nighttime color provided by layer 146, like that illustrated in FIG. 21. Window 106 has a different nighttime color provided by layer 148, FIG. 28.

FIGS. 29 and 30 show a further embodiment reducing the amount of ink used, for cost savings. Layer 144 of FIG. 19 is reduced in size as shown at layer 150 in FIG. 29 to cover only the top of the molded part, which is the portion where the graphic is. Layer 52 may also be reduced in size.

FIGS. 31–36 show a further embodiment. FIG. 31 includes substrate 50 having the following layers printed thereon: opaque layer 152; amber layer 154; translucent white layer 156; smoked translucent ink layer 158; opaque layer 160; transparent hardcoat layer 58. Layers 152, 154, 158 are in alignment with window 104. Layers 156, 160 are in alignment with window 106. The molded part is laser etched to provide the graphics shown in FIG. 35 at the resistive heater symbol at 162, and the text graphic "MIRR HEAT" at 164, for example, for a rocker or paddle switch controlling an electrically heated side mirror on an automobile. In daytime, smoked translucent layer 158 reflects ambient light as shown at 166, 168, FIG. 34, and blocks user view of graphics thereunder. The respective half of the rocker button part aligned with window 104 thus appears blank as shown in FIG. 33 at rocker button portion 170, i.e. graphic 162 is not visible. Also in daytime, white translucent layer 156 reflects ambient light as shown at 172, 174, FIG. 34, such that the user sees the etched graphic "MIRR HEAT" at 164 aligned with window 106. This is shown in FIG. 33 at rocker button half 176 where the user sees graphic 164 "MIRR HEAT" during daytime, which graphic is white because layer 156 is the color white. Other colors may be chosen. At nighttime, with illuminated backlights, the resistive heater symbol graphic on rocker button half 170 is visible as shown in FIG. 35 at 162. The graphic color is amber due to the transmitted light as shown at 178 passing through amber layer 154 from the backlight. The other graphic "MIRR HEAT" at 164 at rocker button half 176 is also visible due to light at 180, FIG. 36, passing through white layer 156 from the backlight.

Figure 37:
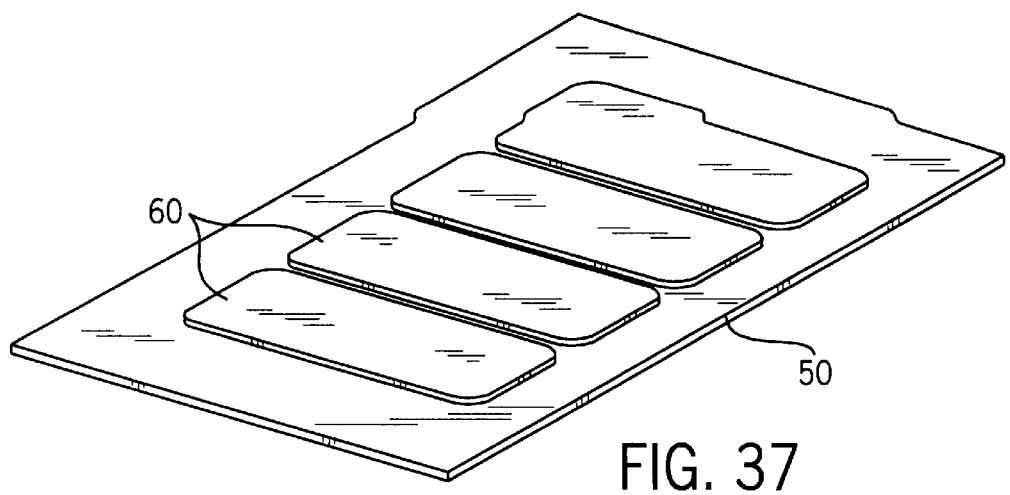
FIG. 37 is like FIG. 2 and shows a further embodiment.
Figure 38:
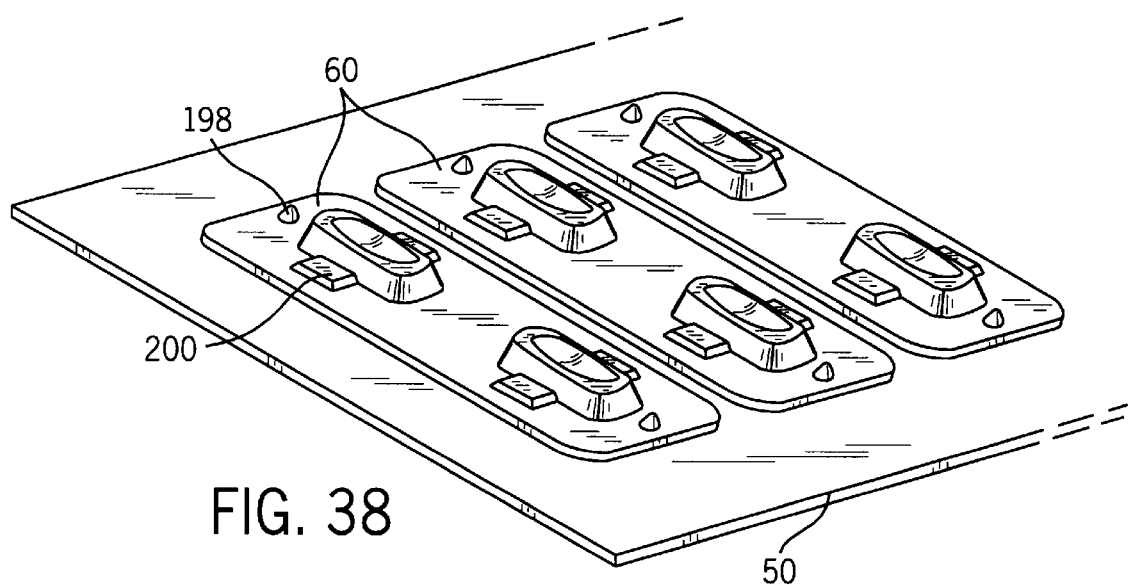
FIG. 38 is like FIG. 4 and shows the contoured workpiece for the combination of FIG. 37.
Figure 39:
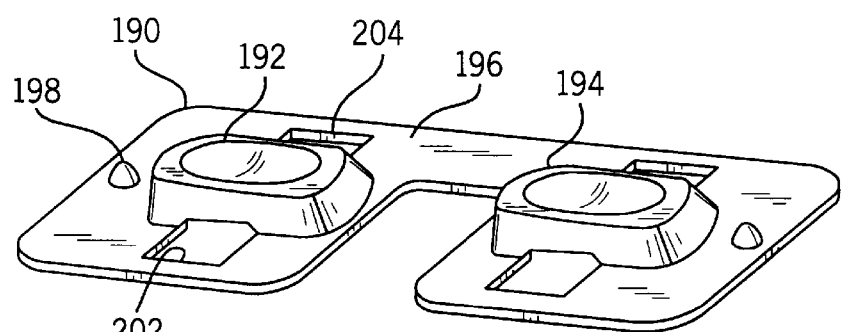
FIG. 39 is a perspective view of the structure of FIG. 38 after cutting into a plurality of subworkpieces.
Figure 40:
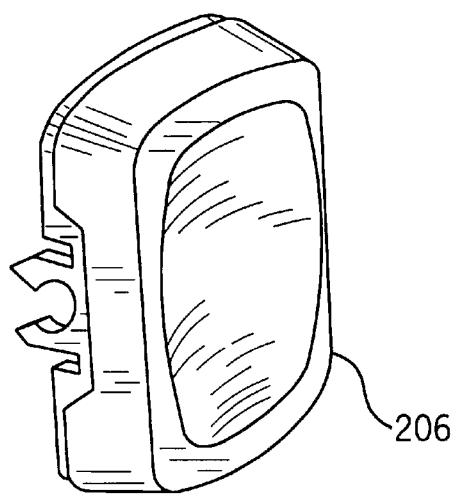
FIG. 40 is like FIG. 9 and illustrates the formed part from the construction of FIG. 39.
Figure 41:
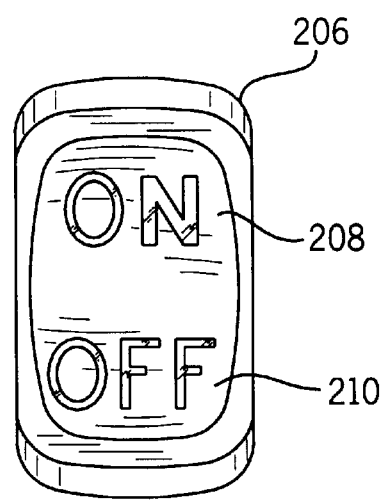
FIG. 41 is like FIG. 12 and illustrates the part of FIG. 40 after laser etching.
Figure 42:
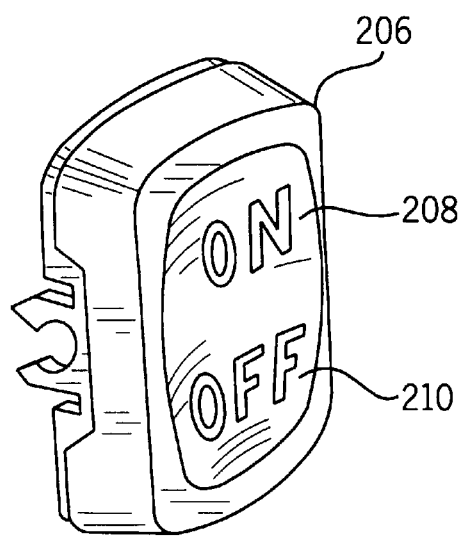
FIG. 42 is a perspective view of the part of FIG. 41.
Figure 43:
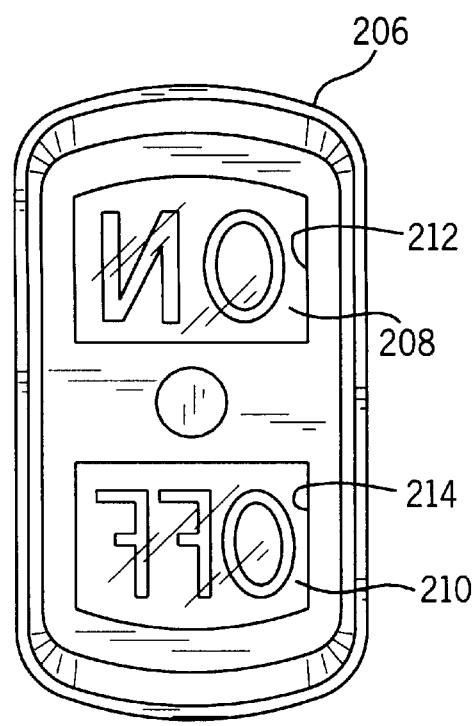
FIG. 43 is a rear elevational view of the part of FIG. 41.

FIG. 37 is similar to FIG. 2 and shows a further embodiment with a plurality of sets of layers 60 printed on substrate 50. The substrate is formed, FIG. 38 into a three dimensional substrate, similarly to FIG. 4. The substrate is cut, preferably by die cutting, into a plurality of workpieces, one of which is shown at 190 in FIG. 39. Each of the workpieces is placed in an injection mold and molded as above described. Each workpiece 190 has at least one product portion, for example product portions 192, 194, to be formed into the respective part, and a registration portion 196 at the periphery of the product portion and which may link a pair of product portions as shown. Workpiece 190 with both product portions 192 and 194 and registration periphery portion 196 is placed in the mold, with registration portion 196 in registration with the mold. A second cutting step is performed, preferably by knife edges such as 94, FIG. 8, in the mold and during the mold closing step to further cut the substrate prior to the injecting step, FIG. 6. The noted second cutting step at least partially detaches registration portion 196 from product portions 192, 194. During the forming step from the construction of FIG. 37 to the construction of FIG. 38, registration marks such as 198 and 200 are formed in registration portion 196. The registration marks are three dimensional deformations of substrate 50 at registration portion 196. Further registration marks such as 202 and 204 are formed during the first mentioned cutting step between the constructions of FIGS. 38 and 39. Registration marks 202, 204 are openings cut through substrate 50 at registration portion 196 during the noted first cutting step. After the noted second cutting step during closing of the mold, and the molding operation, the mold is opened, and each part removed, to provide the molded parts as above described, and as shown at 206, FIG. 40. Designated graphics such as 208, 210, FIG. 41, are then laser etched in the opaque layers 52, 54 on the part at respective windows 212, 214, FIG. 43, formed by blocking surfaces 100, 102 in the mold, as above described.

It is recognized that various equivalents, alternatives and modifications are possible within the scope of the appended claims.

What is claimed is:

1. An in-mold decorating and laser etching method comprising:

providing a flat sheet plastic substrate;

printing an opaque layer on said flat substrate;

forming said flat substrate into a contoured three dimensional workpiece;

placing said workpiece in an injection mold, injecting molten plastic against said workpiece to fuse therewith and form an injection molded part, and removing said part from said injection mold; and laser etching a designated graphic in said opaque layer on said part.

2. The method according to claim 1 wherein said substrate has first and second oppositely facing surfaces, said first surface facing the user, said second surface facing oppositely from said first surface, and comprising:

printing said opaque layer on said first surface; and injecting said molten plastic against said second surface.

3. The method according to claim 2 comprising performing said laser etching step by directing a laser beam at said first surface.

4. The method according to claim 1 comprising printing a color layer on said flat substrate prior to said step of printing said opaque layer.

5. The method according to claim 1 comprising printing a color layer on said flat substrate on the same side as said opaque layer.

6. The method according to claim 5 comprising printing a translucent said color layer on the same side of said substrate as said opaque layer and prior to said step of printing said opaque layer, said translucent layer reflecting ambient light in daytime, and transmitting light therethrough from a backlight in backlit applications at nighttime.

7. The method according to claim 1 comprising printing a color layer on said flat substrate on the opposite side from said opaque layer.

8. The method according to claim 7 comprising printing a translucent said color layer on said substrate, said translucent layer reflecting ambient light in daytime, and transmitting light therethrough from a backlight in backlit applications at nighttime.

9. The method according to claim 1 comprising printing a color layer on said substrate with a laser-vaporization-resistant ink, and printing said opaque layer with a laser-vaporization-susceptible ink.

10. The method according to claim 1 comprising printing a hard coat layer on said opaque layer prior to said forming step.

11. The method according to claim 10 comprising printing a second opaque layer on said first mentioned opaque layer prior to said step of printing said hard coat layer.

12. The method according to claim 11 comprising laser etching said graphic by vaporizing designated portions of said hard coat layer and said first and second opaque layers.

13. The method according to claim 1 comprising printing first and second color layers on said substrate.

14. The method according to claim 13 comprising printing one of said color layers with a first color ink, and printing the other color layer with a second color ink, and wherein:
   in daytime, said part displays to the user said first color at said graphic; and
   at nighttime with a backlight, said part displays to the user said second color at said graphic.

15. The method according to claim 14 comprising printing both of said color layers on the same side of said substrate.

16. The method according to claim 15 comprising printing said second color layer on said first color layer.

17. The method according to claim 14 comprising printing said first and second color layers on opposite sides of said substrate.

18. The method according to claim 14 comprising printing said first color layer on the opposite side of said substrate from said opaque layer.

19. The method according to claim 17 comprising printing said first color layer on the same side of said substrate as said opaque layer.

20. The method according to claim 1 comprising printing a color layer on said flat substrate, providing a blocking surface in said mold engaging said substrate in alignment with said color layer at a designated window and blocking engagement of said molten plastic against said substrate at said window.

21. The method according to claim 20 comprising printing said color layer on the opposite side of said substrate engaged by said molten plastic.

22. The method according to claim 20 comprising printing said color layer on the same side of said substrate engaged by said molten plastic.

23. The method according to claim 1 wherein said substrate has first and second oppositely facing surfaces, said first surface facing the user, said second surface facing oppositely from said first surface, and comprising injecting said molten plastic against said second surface.

24. The method according to claim 23 comprising printing said opaque layer on said first surface.

25. The method according to claim 23 comprising printing said opaque layer on said second surface.

26. The method according to claim 23 comprising printing a color layer on said substrate.

27. The method according to claim 23 comprising:
   printing a first color layer on said substrate; and
   printing a second color layer on said substrate reflecting ambient daytime light and blocking user view of said graphic, and transmitting light therethrough at nighttime from a backlight and through said first color layer for user viewing of said graphic.

28. The method according to claim 27 wherein said first color layer is printed on said first surface of said substrate, and said second color layer is printed on said first color layer.

29. The method according to claim 26 comprising printing said color layer is printed with translucent ink.

30. The method according to claim 1 wherein said substrate has first and second oppositely facing surfaces, said first surface facing the user, said second surface facing oppositely from said first surface, said first and second surfaces having laterally spaced first and second portions, and comprising:
   printing a first said opaque layer on said first portion of said first surface;
   printing a second opaque layer on a second portion of said second surface laterally spaced from said first portion; and
   injecting said molten plastic against said second surface.

31. The method according to claim 30 comprising printing a first color layer on said substrate at one of said first and second portions; and
   printing a second color layer on said substrate at the other of said first and second portions.

32. The method according to claim 31 comprising printing a third color layer on said substrate at said other of said first and second portions and in alignment with said first color layer and reflecting daytime ambient light to block user view of said graphic at said other portion and transmitting light from said backlight therethrough at nighttime to provide user view of said graphic through said first color layer at nighttime, and wherein said second color layer reflects ambient daytime light and provides user view of said graphic at said one portion during daytime.

33. The method according to claim 1 wherein said substrate has first and second oppositely facing surfaces, said first surface facing the user, said second surface facing oppositely from said first surface, and comprising printing a first color layer on said second surface of said substrate, and printing a second color layer on said first surface of said substrate, and comprising providing a blocking surface in said mold engaging said first color layer on said second surface at a designated window and blocking engagement of said molten plastic against said window.

34. The method according to claim 33 comprising printing said second color layer on said first surface of said flat substrate, and printing said first color on said second surface of said flat substrate, and wherein:
   in daytime, said part displays to the user said second color at said graphic; and at nighttime with a backlight, said part displays to the user said first color at said graphic.

35. The method according to claim 34 comprising:

printing said first color on a first portion of said second surface of said flat substrate;

printing a third color layer on a second portion of said second surface of said flat substrate;

providing a first said blocking surface in said mold engaging said first color layer on said first portion of said second surface at a first said designated window and blocking engagement of said molten plastic against said first window;

providing a second blocking surface in said mold engaging said third color layer on said second portion of said second surface at a second designated window and blocking engagement of said molten plastic against said second window;

wherein said first surface has a first said graphic opposite said first window, and a second graphic opposite said second window, said part has a first position displaying to the user said first color at said first graphic at nighttime with a backlight, and a second position displaying to the user said third color at said second graphic at nighttime with a backlight.

36. The method according to claim 1 comprising thermalforming said flat substrate into said contoured three dimensional workpiece.

37. An in-mold decorating and laser etching method comprising:

providing a flat sheet plastic substrate;

printing an opaque layer on said flat substrate;

forming said flat substrate into a contoured three dimensional substrate;

cutting said three dimensional substrate into a plurality of workpieces;

placing at least one of said workpieces in an injection mold, closing said mold, injecting molten plastic against said workpiece to fuse therewith and form an injection molded part, and removing said part from said mold; and laser etching a designated graphic in said opaque layer on said part.

38. The method according to claim 37 comprising:

cutting said three dimensional substrate into said plurality of workpieces each having a product portion to be formed into said part, and a registration portion at the periphery of said product portion;

placing said workpiece in said mold, and performing a second cutting step further cutting said substrate prior to said injecting step.

39. The method according to claim 38 wherein said second cutting step detaches said registration portion from said product portion.

40. The method according to claim 38 comprising forming one or more registration marks in said registration portion during said forming step.

41. The method according to claim 40 wherein said registration marks are three dimensional deformations of said substrate at said registration portion.

42. The method according to claim 38 comprising forming one or more registration marks in said registration portion during said first mentioned die cutting step.

43. The method according to claim 42 wherein said registrations marks are openings cut through said substrate at said registration portion.

44. The method according to claim 38 comprising performing said second cutting step during said mold closing step.

45. The method according to claim 38 comprising:

forming a first set of one or more registration marks in said registration portion during said forming step; and forming a second set of one or more registration marks in said registration portion during said first mentioned cutting step.

46. The method according to claim 45 wherein said first set of registration marks are three dimensional deformations of said substrate at said registration portion, and said second set of registration marks are openings in said substrate at said registration portion.

47. The method according to claim 38 comprising:

during said forming step, forming a first set of one or more registration marks in said registration portion;

during said first mentioned cutting step, forming a second set of one or more registration marks in said registration portion; and during said mold closing step, performing said second cutting step at least partially detaching said registration portion from said product portion.

* * * * *